United States Patent [19]
Robin et al.

[11] Patent Number: 6,127,435
[45] Date of Patent: Oct. 3, 2000

[54] PROCESS FOR THE TREATMENT OF GROUND POLYOLEFIN MATERIAL, GROUND MATERIAL OBTAINED BY THIS PROCESS AND USE THEREOF FOR THE PRODUCTION OF SHAPED OBJECTS

[75] Inventors: Jean-Jacques Robin, Clapiers; Valérie Bromont, Montpellier, both of France; Etienne Hannecart, Tervuren, Belgium; Jean-Marie Yernaux, Rixensart, Belgium; Bernard Vandenhende, Leest, Belgium; Frank Devlieghere, Gent, Belgium

[73] Assignee: Solvay Polyolefins Eurpoe—Belgium (Societe Anonyme), Brussels, Belgium

[21] Appl. No.: 08/862,388

[22] Filed: May 23, 1997

[51] Int. Cl.$^7$ ....................................................... C08F 6/28

[52] U.S. Cl. .......................... 521/47; 525/333.8; 525/387

[58] Field of Search ................................ 521/47; 525/387

[56] References Cited

FOREIGN PATENT DOCUMENTS

| 0004601 | 10/1979 | European Pat. Off. . |
|---|---|---|
| 2148602 | 3/1973 | France . |
| 4322328 | 1/1995 | Germany . |
| 93/10916 | 6/1993 | WIPO . |

OTHER PUBLICATIONS

Brochure Solvay "Plastics Recycling" printed Nov. 1994.

*Primary Examiner*—Bernard Lipman
*Attorney, Agent, or Firm*—Venable

[57] ABSTRACT

Process for the treatment of ground polyolefin material originating from scrap dairy product containers with at least one agent chosen from hydrogen peroxide, steam and sodium hydroxide in a quantity which is effective for deodorizing the polyolefin. Ground material obtained by this process and exhibiting an imperceptible level of residual odour of aged milk. Use of the deodorized ground material obtained by this process for the production of shaped objects.

5 Claims, No Drawings

PROCESS FOR THE TREATMENT OF GROUND POLYOLEFIN MATERIAL, GROUND MATERIAL OBTAINED BY THIS PROCESS AND USE THEREOF FOR THE PRODUCTION OF SHAPED OBJECTS

The present invention relates to a process for the treatment of ground polyolefin material originating from scrap dairy product containers. The invention additionally relates to the ground material obtained by this process and its use for the production of shaped objects.

Environmental considerations continually increase interest in the recycling of plastics. Among the latter, polyolefins are widely employed as raw material for manufacturing receptacles intended to contain dairy products. In this case the recovery of the polyolefins for a subsequent use requires the removal of various contaminants present in the ground material obtained from scrap containers. These contaminants include especially paper originating from the labels, aluminium originating from the closures and the odours of aged milk.

In patent U.S. Pat. No. 436 8274 it is known to separate the aluminium present in chips of polyethylene terephthalate bottles by means of an aqueous solution of sodium hydroxide.

Furthermore, patent application EP-A-004601 proposes a process for separating highly odorous compounds from polyolefin particles by means of a stream of steam. The ingredients of intense odour are defined as being organic materials which have a melting point of 150 to 250° C., particularly those containing from 8 to 10 carbon atoms and of the order of 12% by weight of oxygen.

Patent application DE-A-4322328 describes, in its Example II, the treatment of polycarbonate milk bottles which have an odour of aged cheese with peracetic acid after conventional washing which, by itself, is not sufficient to remove the odours of aged cheese. The results observed show that the residual odour level obtained after this treatment with peracetic acid is low but not nil.

The invention is aimed at providing a new process for the treatment of ground polyolefin material originating from scrap dairy product containers, which makes it possible to ensure the deodorization of this ground polyolefin material by the substantial or even total removal of the characteristic odour of aged milk and consequently, to envisage their reutilization (recycling).

To this end the invention relates to a process for the treatment of ground polyolefin material originating from scrap dairy product containers, according to which the ground polyolefin material is treated with at least one agent chosen from hydrogen peroxide, steam and sodium hydroxide in an effective quantity for deodorizing the polyolefin.

According to the invention, ground material is intended to denote the particles obtained as a result of the grinding of scrap dairy product containers. These particles may be in the form of scales, chips, flakes, strips, platelets or granules of average dimensions which can vary according to the screens used in the mill. The particles usually have an average dimension greater than or equal to 0.1 mm, in particular greater than or equal to 1 mm; preferably greater than or equal to 2 mm. The particles usually have an average dimension smaller than or equal to 6 cm, in particular smaller than or equal to 5 cm, preferably smaller than or equal to 3 cm. The particles obtained as a result of the grinding of scrap dairy product containers generally have an average thickness greater than or equal to 0.1 mm, preferably greater than or equal to 0.5 mm. It is generally smaller than or equal to 2 cm, preferably smaller than or equal to 1 cm. A series of treatments can be performed in order to rid the ground material of paper, of organic residues and of most of the fragments of aluminium-covered necks, such as, for example, centrifuging, decanting, draining, rinsing and drying operations.

According to the invention a dairy product container is intended to denote any hollow utensil which can be used to contain dairy products, like for example, flasks, bottles or pots. A dairy product is intended to denote milk as well as any food substance originating from milk or containing it, such as, for example, butter-milk, curdled milk, yoghurts and milky beverages. The invention applies particularly to scrap containers which have held milk and very particularly to scrap milk bottles.

An effective quantity of agent for deodorizing polyolefin is intended to denote a quantity which is at least sufficient to reduce the odour of aged milk. This quantity will, of course, depend on the level of contamination of the ground material being treated and on the effectiveness of the deodorizing agent. In practice it will be evaluated in each particular case by preliminary tests. To give an idea, in general the effective quantity of hydrogen peroxide for reducing the odour of aged milk can vary from 0.5 to 4.5 kg of hydrogen peroxide per kg of polyolefin. The effective quantity of steam for reducing the odour of aged milk generally varies from 0.5 to 11 kg of steam per kg of polyolefin. The effective quantity of sodium hydroxide for reducing the odour of aged milk generally varies from 0.04 to 2 kg of sodium hydroxide per kg of polyolefin.

The treatment of the ground polyolefin material originating from scrap dairy product containers with hydrogen peroxide is generally performed at a temperature of 60 to 110° C. The temperature will be generally higher than 60° C., preferably higher than or equal to 80° C. and, in a more than preferred manner, higher than or equal to 90° C. The temperature will be generally lower than 110° C., preferably lower than or equal to 100° C. A temperature of 100° C. has given good results.

The pressure at which the treatment of the ground polyolefin material is performed with hydrogen peroxide is not critical. In most cases the treatment is performed at atmospheric pressure.

The total duration of the treatment of the ground polyolefin material with hydrogen peroxide, including, in addition to the actual treatment period, the bringing up to temperature and the cooling stage, is generally from 30 to 180 minutes. A total period shorter than 180 minutes and preferably shorter than or equal to 140 minutes is suitable. The total duration is generally longer than 30 minutes, preferably longer than or equal to 60 minutes. A total duration of 135 minutes has given good results.

The treatment of ground polyolefin material with hydrogen peroxide is generally performed with an aqueous solution of hydrogen peroxide of 10 to 35% by volume. The hydrogen peroxide concentration in the aqueous solution is higher than 10% by volume, preferably higher than or equal to 15% by volume. Good results have been obtained with an aqueous solution of hydrogen peroxide of 15 to 35% by volume.

After the treatment of the ground polyolefin material with hydrogen peroxide, the ground material is rinsed several times with water and methanol and is next dried in an oven. Alternatively, it can be washed and rinsed with water and then dried with hot air.

The duration of the treatment of the ground polyolefin material with a stream of steam is generally from 40 to 160 minutes. A period longer than 40 minutes and preferably longer than or equal to 60 minutes is suitable. Similarly, the durations of treatment generally do not exceed 120 minutes. The flow rate of steam to be employed for the treatment of the ground polyolefin material generally varies from 1 to 4 kg of steam per hour and per kg of polyolefin. The flow rate of steam is usually higher than 1 kg of steam per hour and per kg of polyolefin, preferably higher than or equal to 1.5 kg of steam per hour and per kg of polyolefin. The flow rate of steam is generally lower than 4 kg of steam per hour and per kg of polyolefin, preferably lower than or equal to 3 kg of steam per hour and per kg of polyolefin. Good results have been obtained with 1.7 kg of steam per hour and per kg of polyolefin, and also with 2.9 kg of steam per hour and per kg of polyolefin.

The treatment of the ground polyolefin material with steam is generally performed at a temperature lower than or equal to 110° C. Good results have been obtained at 100° C.

The pressure at which the treatment of the ground polyolefin material with steam is performed is not critical. In most cases the treatment is performed at atmospheric pressure.

The treatment with a stream of steam is advantageously performed in a stripping column.

After the treatment of the ground polyolefin material with steam, the material is subjected to drying with hot air.

The treatment of the ground polyolefin material with sodium hydroxide is generally performed at a temperature of 25 to 110° C. A temperature of at least 30° C. and, preferably, of at least 50° C. is suitable. The temperature generally will not exceed 100° C. and, in a more than preferred manner, will not exceed 95° C. The best results have been obtained at 90° C.

The pressure at which the treatment of the ground polyolefin material with sodium hydroxide is performed is not critical. In most cases the treatment is performed at atmospheric pressure.

The duration of the treatment with sodium hydroxide is generally from 30 to 120 minutes. The period of treatment is preferably at least 45 minutes. Similarly, the period of treatment is generally shorter than 120 minutes and preferably shorter than or equal to 90 minutes. A period of approximately 60 minutes has given good results.

The treatment of the ground polyolefin material with sodium hydroxide is generally performed by means of an aqueous solution of sodium hydroxide which has a mass concentration of sodium hydroxide of 1 to 20%. The sodium hydroxide concentration is usually at least 2% on a mass basis and preferably at least 3% on a mass basis. The concentration of the aqueous sodium hydroxide solution will be lower than 20% on a mass basis and preferably lower than or equal to 10% on a mass basis. Use of an aqueous sodium hydroxide solution at a concentration of 6.6% on a mass basis has given excellent results.

After the treatment of the ground polyolefin material with sodium hydroxide, the material is subjected to a sequence of treatments of draining—washing with water—draining and is then dried.

Among the deodorizing agents used in the process of the invention preference is given to steam and to hydrogen peroxide, the latter being very particularly preferred. As for sodium hydroxide, which provides a deodorization that is very significant but nevertheless less thorough than that obtained during the treatment with steam or during the treatment with hydrogen peroxide, it has the advantage of dissolving the residual aluminium originating from the closures of the bottles and not removed during the preceding stages. The treatment with sodium hydroxide additionally makes it possible to dispense with or to simplify certain operations prior to the deodorization treatment consisting in removing the aluminium residues originating from the bottle closures.

In a particular embodiment of the invention the treatment of the ground polyolefin material originating from scrap dairy product containers with steam is preceded by a treatment with sodium hydroxide.

In another particular and preferred embodiment the treatment of the ground polyolefin material originating from scrap dairy product containers with hydrogen peroxide is preceded by a treatment with sodium hydroxide.

In these particular embodiments the successive treatments are formed in the general conditions described above for the individual treatments.

For the purpose of the present invention, polyolefin is intended to denote the homopolymers and copolymers with at least one comonomer of the olefins containing from 2 to 20 carbon atoms and in particular from 2 to 6 carbon atoms, such as ethylene, propylene, 1-butene, 4-methyl-1-pentene and 1-hexene. Ethylene and propylene polymers are preferred. Ethylene polymers are particularly preferred. Alpha-olefins containing from 3 to 8 carbon atoms may be mentioned as comonomer of ethylene. Butene, hexene and mixtures thereof are preferred. The comonomer content in the ethylene polymer is generally at least 0.1% by weight, in particular at least 0.5% by weight and in most cases at least 1% by weight.

The comonomer content is usually at most 10% by weight, more precisely at most 8% by weight, values of at most 5% by weight being the most common ones.

The ethylene polymers usually have a melt index, measured at 190° C. under a 5 kg load according to ASTM Standard D 1238—Condition P (1986) (called $MI_5$ hereinafter) of 0.3 to 10 g/10 min. The melt index $MI_5$ is at least 0.3 g/10 min, in particular at least 0.6 g/10 min. In general the $MI_5$ does not exceed 10 g/10 min and in most cases does not exceed 6 g/10 min. The ethylene polymers commonly have a standard density measured according to ISO Standard 1183 (1987) of 945 to 965 kg/m³. The standard density is at least 945 kg/m³, in particular at least 950 kg/m³, values of at least 952 kg/m³ being preferred. In general the standard density does not exceed 965 kg/m³ and more precisely does not exceed 962 kg/m³.

The invention also relates to the ground material obtained by the process according to the invention which exhibits an imperceptible residual odour of aged milk. This ground material, freed from the presence of any contaminant originating from a previous use, can be recovered (recycled) for a subsequent use. In particular, this ground material can be used for the production of new shaped objects. Very particularly this ground material can be used for the manufacture of new containers which can be used in the food industry and especially for the manufacture of new dairy product containers. It can also be employed, for example, for the production of objects such as receptacles intended to contain waste, or pallets intended for handling goods.

The process according to the invention applies to the treatment of ground polyolefin material originating from scrap dairy product containers. It is particularly highly suitable for the treatment of ground polyethylene material originating from scrap milk bottles.

The examples which follow are given with the aim of illustrating the invention without, however, limiting its scope.

EXAMPLE 1

8 kg of polyethylene chips originating from scrap milk flasks and characterized by a nauseating odour, fairly variable in size but smaller than 3 cm, are introduced into a 200-litre reactor. 80 litres of aqueous hydrogen peroxide at a concentration of 35% by volume are next poured into the reactor before the latter is closed and before the mechanical stirring is started up at 100 revolutions/minute. Bringing up to temperature is carried out using steam circulating at 140° C. in the reactor jacket. The rise in temperature from 20 to 100° C. is performed over 45 minutes, this temperature is stabilized for 30 minutes and then the stage of cooling from 100 to 90° C. is initiated and lasts 60 minutes. Once the temperature of 90° C. is reached, the aqueous hydrogen peroxide alone is drained out. The polyethylene is next rinsed with two times 100 litres of water. At the end of the second rinsing, all the water having been removed, the chips are extracted from the reactor with a suction device. After this second rinsing with water the 8 kg of chips are rinsed with 20 litres of methanol and are dried in an oven at 40° C. for 14 hours.

An odour test is next carried out on the polyethylene chips obtained. The odour test consists in leaving 10 g of polyethylene at rest in a Petri dish for 14 hours in an oven at 80° C. After the specified time the Petri dishes are opened and smelled. They are given a mark from 0 to 10, 0 denoting the complete disappearance of the odour and 10 that of the odour of the untreated chips. This mark characterizes the "hot odour". A second mark is given after 2 hours of cooling to ambient temperature. This mark characterizes the "cold odour".

The mark given after the treatment with hydrogen peroxide as specified above is 0 for the cold odour as well as for the hot odour, whereas the odour test applied to untreated chips (control) gives a mark of 10 for the cold odour and for the hot odour.

EXAMPLE 2

26 kg of polyethylene flakes 8 mm in diameter, originating from scrap milk flasks, characterized by a nauseating odour (odour level 4), are introduced into a glass column in which the height of the stationary bed of flakes above the perforated plate is approximately 1 m. The flakes are then subjected to stripping with steam at 100° C. The steam flow rate is 1.7 kg of steam per hour and per kg of polyethylene. After 60 minutes the odour level is almost imperceptible (odour level 0.5); after 120 minutes it can be considered to be nil (lower than 0.5).

After the steam treatment the ground material is dried with hot air at a surface speed of 0.25 m/s for 3–4 hours, the air temperature being of the order of 50–85° C.

The odour test employed for determining the odour level consists in placing 10 g of polyethylene flakes which have been subjected to the treatments indicated above in a closed glass flask and leaving at rest until the temperature reaches the ambient temperature. 10 g of flakes exhibiting a nauseating odour and untreated, on the one hand, and 10 g of virgin resin flakes, on the other hand, are also placed in a closed glass flask. The various flasks are opened at the same time and smelled by four different people. A mark of 0 to 4 is given; 0 corresponds to the absence of odour (virgin resin), and 4 corresponds to the maximum odour (untreated flakes). The mark recorded corresponds to the average of the marks given by the four people performing the test. Below 0.5 the odour level is considered to be imperceptible; some people in fact no longer detect any odour.

EXAMPLE 3

30 kg of polyethylene chips from 8 to 20 mm in diameter, originating from the grinding of scrap milk flasks, containing 0.41 g/kg of aluminium and exhibiting a nauseating odour (odour level 4) are introduced into a stirred 200-litre stainless steel vessel fitted with a jacket. Bringing up to temperature is carried out by steam circulation in the reactor jacket. The treatment with 130 litres of an aqueous solution of 6.6% NaOH, on a mass basis, is next carried out for 1 hour at 90° C. After this treatment the ground material is subjected to a sequence of treatments of draining—washing with water at 22° C.—draining and is dried next.

In these conditions it is found that the residual odour level is 1.81 after the soda treatment. Moreover, all the residual aluminium has dissolved.

The odour test employed for determining the odour level consists in placing 10 g of polyethylene flakes which have been subjected to the treatment indicated above in a closed glass flask and in leaving at rest until the temperature reaches the ambient temperature. 10 g of flakes exhibiting a nauseating odour and untreated, on the one hand, and 10 g of virgin resin flakes, on the other hand, are also placed in a closed glass flask. The various flasks are opened at the same time and smelled by 4 different people. They are given a mark from 0 to 4;0 corresponds to the absence of odour (virgin resin) and 4 corresponds to the maximum odour (untreated flakes). The mark recorded corresponds to the average of the marks given by the 4 people carrying out the test.

EXAMPLE 4

Polyethylene flakes originating from milk flasks, characterized by a nauseating odour, are first of all subjected to a treatment with an aqueous sodium hydroxide solution in the conditions defined in Example 3, and are next subjected to a treatment with a stream of steam in a stripping column according to Example 2. It is observed that the nauseating odour is completely removed. Furthermore, all the residual aluminium is removed.

Organoleptic tests are carried out. To do this, solutions consisting of drinking water are stored at ordinary temperature for 2 days in different bottles made from recycled polyethylene which has optionally been treated with sodium hydroxide and/or a stream of steam. A bottle made from virgin polyethylene is used as control. 24 judges have been trained to recognize the typical taste of aged milk. The test for the judges consists of a triangular trial. The judges are given two aqueous solutions to be compared, namely the aqueous solution which has been in contact with the virgin material and that which has been in contact with the recycled and optionally treated material.

The first solution is given in 2 specimens, the second in one specimen. The judges' task is to determine which is the sample which is not repeated. The results are as follows:

- water from the bottle consisting of recycled and untreated polyethylene: 15 tasters out of 24 chose the sample which is not repeated;
- water from the bottle consisting of polyethylene which is recycled and treated with sodium hydroxide; 12 tasters out of 24 chose the sample which is not repeated;
- water from the bottle consisting of polyethylene which is recycled and treated with sodium hydroxide and then with a stream of steam: 5 tasters out of 24 chose the sample which is not repeated.

The tensile modulus, measured on test pieces cut from the wall of a bottle made from polyethylene which has been recycled and treated with sodium hydroxide and a stream of steam, is identical with that measured in the same conditions on test pieces cut from the wall of a bottle made from virgin polyethylene, namely 300 MPa. The same applies to the yield strength, which is 19 MPa, for the control and for the product treated with sodium hydroxide and a stream of steam.

What is claimed is:

1. A process for the treatment of ground polyolefin material originating from scrap dairy product containers, comprising treating a ground polyolefin material with hydrogen peroxide in a quantity which is effective for deodorizing the polyolefin.

2. The process according to claim 1, wherein the treatment with hydrogen peroxide is performed at a temperature of 60 to 110° C. and for a period of 30 to 180 minutes.

3. The process according to claim 1, wherein the treatment with hydrogen peroxide is preceded by a treatment with sodium hydroxide.

4. The process according to claim 3, wherein the treatment with sodium hydroxide is performed at a temperature of 25° C. to 110° C. and for a period of 30 to 120 minutes.

5. The process according to claim 1, wherein the polyolefin is an ethylene polymer selected from the group consisting of ethylene homopolymers and copolymers.

* * * * *